(12) United States Patent
Doemling et al.

(10) Patent No.: US 10,740,962 B2
(45) Date of Patent: Aug. 11, 2020

(54) METHOD AND APPARATUS FOR UNCERTAINTY MODELING OF POINT CLOUD

(71) Applicant: Bayerische Motoren Werke Aktiengesellschaft, Munich (DE)

(72) Inventors: Maximilian Doemling, Shanghai (CN); Sebastian Granzow, Kirchheim (DE); Wanli Jiang, Shanghai (CN); Qianshan Li, Shanghai (CN); Rick Li, Shanghai (CN); Bill Lv, Shanghai (CN); Ivan Xu, Shanghai (CN); Tomas Xu, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/451,227

(22) Filed: Jun. 25, 2019

(65) Prior Publication Data
US 2019/0311532 A1    Oct. 10, 2019

Related U.S. Application Data

(63) Continuation of application No. PCT/CN2016/112194, filed on Dec. 26, 2016.

(51) Int. Cl.
| | | |
|---|---|---|
| *G06T 17/00* | (2006.01) |
| *G01C 21/20* | (2006.01) |
| *G05D 1/02* | (2020.01) |

(52) U.S. Cl.
CPC ........... *G06T 17/005* (2013.01); *G01C 21/20* (2013.01); *G05D 1/024* (2013.01)

(58) Field of Classification Search
None
See application file for complete search history.

(56) References Cited

FOREIGN PATENT DOCUMENTS

| | | |
|---|---|---|
| CN | 103366158 A | 10/2013 |
| CN | 103616021 A | 3/2014 |
| CN | 103644904 A | 3/2014 |
| WO | WO 2016/201670 A1 | 12/2016 |

OTHER PUBLICATIONS

Pauly, Mark, Niloy J. Mitra, and Leonidas J. Guibas. "Uncertainty and variability in point cloud surface data." SPBG 4 (2004): 77-84 (Link: https://geometry.stanford.edu/papers/pmg-uvpcsd-04/pmg-uvpcsd-04.pdf) (Year: 2004).*

(Continued)

*Primary Examiner* — Nurun N Flora
(74) *Attorney, Agent, or Firm* — Crowell & Moring LLP

(57) ABSTRACT

A method and an apparatus for uncertainty modeling of a point cloud and a non-transient storage medium are provided. The method finds the neighboring points for each point; fits a local quadratic surface for each point; and generates a Gaussian Model (GM) for representing the uncertainty modeling of the local surface at each point. The GM is constructed in a piece-wise manner on the underlying surface of the point cloud, which will accurately model the surface uncertainty.

18 Claims, 3 Drawing Sheets

(56) References Cited

OTHER PUBLICATIONS

Lu F. et al., "Robot Pose Estimation In Unknown Environments by Matching 2D Range Scans", Computer Vision and Pattern Recognition, 1994, pp. 935-938, Proceedings CVPR'94, IEEE Computer Society Conference on IEEE (four (4) pages).
Stewart C. et al., "The Dual-Bootstrap Iterative Closest Point Algorithm With Application To Retinal Image Registration.", IEEE Transactions On Medical Imaging, Nov. 2003, pp. 1379-1394, vol. 22, No. 11 (16 pages).
Gálvez A. et al., "Particle Swarm Optimization For Non-Uniform Rational B-Spline Surface Reconstruction From Clouds of 3D Data Points", Information Sciences, 2012, pp. 174-192, vol. 192, Elsevier (19 pages).
Jian B. et al., "Robust Point Set Registration Using Gaussian Mixture Models", IEEE Transactions on Pattern Analysis and Machine Intelligence, 2011, pp. 1-14 (14 pages).
Biber P. et al., "The Normal Distributions Transform: A New Approach To Laser Scan Matching", Intelligent Robots and Systems, 2003, IEEE/RSJ International Conference on vol. 3 (six (6) pages).
Stoyanov T. et al., "Fast And Accurate Scan Registration Through Minimization Of The Distance Between Compact 3D NDT Representations.", The International Journal of Robotics Research, 2012, vol. 31, Issue No. 12, pp. 1377-1393 (17 pages).
Liu K. et al., "Simplification Of Pont Cloud Data Based On Gaussian Curvature", IET International Conference On Smart And Sustainable City 2013, Aug. 31, 2013, pp. 84-87 (four (4) pages).
Das A., et al., "Scan Registration Using Segmented Region Growing NDT." The International Journal of Robotics Research, 2014, 1645-1663, vol. 33, Issue No. 13, Sage Pub (19 pages).
International Search Report (PCT/ISA/210) issued in PCT Application No. PCT/CN2016/112194 dated Sep. 6, 2017 (two (2) pages).
Written Opinion (PCT/ISA/237) issued in PCT Application No. PCT/CN2016/112194 dated Sep. 6, 2017 (three (3) pages).

\* cited by examiner

METHOD AND APPARATUS FOR UNCERTAINTY MODELING OF POINT CLOUD

CROSS REFERENCE TO RELATED APPLICATION

This application is a continuation of PCT International Application No. PCT/CN2016/112194, filed Dec. 26, 2016, the entire disclosure of which is herein expressly incorporated by reference.

BACKGROUND AND SUMMARY OF THE INVENTION

The present invention relates in general to the field of vehicle/robot localization, and more particularly, to a method and an apparatus for uncertainty modeling of a point cloud.

For a driving vehicle to detect the environment using laser scanner(s) and to use the acquired data in tasks like localization, navigation and recognition, etc., it is important to model the uncertainty of the point cloud for both the map data and real time observed data. The uncertainty model of the point cloud allows us to calculate the probability of matching or recognition, and a good uncertainty model may help to make the calculation more accurate and more efficient. Prior methods include: ICP algorithm;[1] IDC algorithm;[2] NURB (spline surface in 3D);[3] PAMI ICP algorithm;[4] 2D-NDT;[5] 3D-NDT;[6] Region Growing NDT.[7]

REFERENCES

[1] Lu, Feng, and Evangelos E. Milios. "Robot pose estimation in unknown environments by matching 2d range scans." Computer Vision and Pattern Recognition, 1994. Proceedings CVPR'94, 1994 IEEE Computer Society Conference on IEEE, 1994.
[2] Stewart, Charles V., Chia-Ling Tsai, and Badrinath Roysam. "The dual-bootstrap iterative closest point algorithm with application to retinal image registration." IEEE transactions on medical imaging 22.11 (2003): 1379-1394.
[3] Gálvez, Akemi, and Andrés Iglesias. "Particle swarm optimization for non-uniform rational B-spline surface reconstruction from clouds of 3D data points." Information Sciences 192 (2012): 174-192.
[4] Jian, Bing, and Baba C. Vemuri. "Robust point set registration using gaussian mixture models." IEEE Transactions on Pattern Analysis and Machine Intelligence 33.8 (2011): 1633-1645.
[5] Biber, Peter, and Wolfgang Strapβer. "The normal distributions transform: A new approach to laser scan matching." Intelligent Robots and Systems, 2003. (IROS 2003). Proceedings 2003 IEEE/RSJ International Conference on Vol. 3. IEEE, 2003.
[6] Stoyanov, Todor Dimitrov, et al. "Fast and accurate scan registration through minimization of the distance between compact 3D NDT representations." The International Journal of Robotics Research (2012): 0278364912460895.
[7] Das, Arun, and Steven L. Waslander. "Scan registration using segmented region growing NDT." The International Journal of Robotics Research 33.13 (2014): 1645-1663.

For references [1], [2] and [3], the technical solutions relate to point cloud but do not relate to uncertainty models, so it is impossible to calculate reasonable matching or recognition scores because the calculation of these scores are derived from probability theory and need the probability model of the data.

Reference [4] relates to point cloud with unified covariance, and the uncertainty is not accurately modeled so that the matching or recognition scores cannot be accurately calculated.

References [5], [6] and [7], disclose that the point clouds are divided using a grid and modeled by Gaussian distribution within each grid cell, but the uncertainty model is not accurate.

An aspect of the present invention is to provide a novel method and an apparatus for uncertainty modeling of a point cloud.

In accordance with an exemplary embodiment of the present invention, there is provided a computer-implemented method for uncertainty modeling of a point cloud, including: finding the neighboring points for each point; fitting a local quadratic surface for each point; generating a Gaussian Model for representing the uncertainty modeling of the local surface at each point.

In accordance with an exemplary embodiment of the present disclosure, there is provided an apparatus for uncertainty modeling of a point cloud, including: a memory having computer executable instructions stored therein; and a processor coupled to the memory and configured to: find the neighboring points for each point; fit a local quadratic surface for each point; generate a Gaussian Model for representing the uncertainty modeling of the local surface at each point.

In accordance with an exemplary embodiment of the present disclosure, there is provided a non-transient storage medium having instructions stored thereon that when executed cause a processor to implement a computer-implemented method for uncertainty modeling of a point cloud, comprising: instructions for causing the processor to find the neighboring points for each point; instructions for causing the processor to fit a local quadratic surface for each point; and instructions for causing the processor to generate a Gaussian Model for representing the uncertainty modeling of the local surface at each point.

In accordance with an exemplary embodiment of the present disclosure, there is provided an apparatus for uncertainty modeling of a point cloud, comprising: a neighboring points finding unit configured to find the neighboring points for each point; a local quadratic surface fitting unit configured to fit a local quadratic surface for each point; a Gaussian Model generating unit configured to generate a Gaussian Model for representing the uncertainty modeling of the local surface at each point.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

Other objects, advantages and novel features of the present invention will become apparent from the following detailed description of one or more preferred embodiments when considered in conjunction with the accompanying drawings.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the disclosure.

DETAILED DESCRIPTION OF THE DRAWINGS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

The point cloud acquired by laser scanners is normally very accurate along the surface normal directions, but the points are sometimes sparsely distributed on the surface. To model the uncertainty of the point cloud, neither directly using the uncertainty of each individual point nor measuring the uncertainties of the equally segmented grid cells of the point cloud is accurate. The present invention aims to accurately estimate the uncertainty of the continuous surface, which is implied by the sparse sample points.

Figure 1:
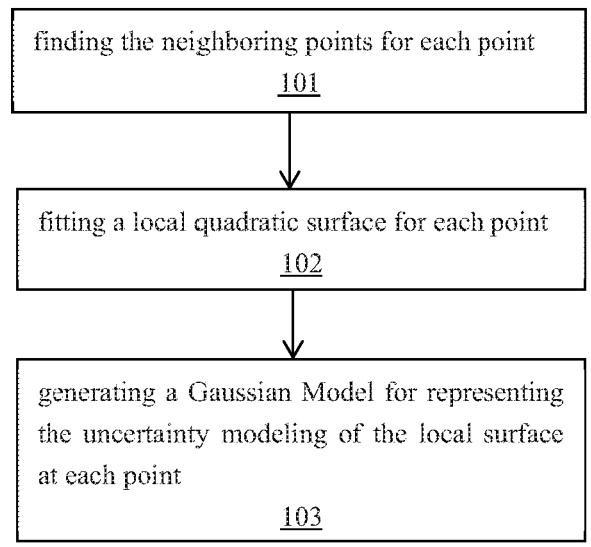
FIG. 1 illustrates a high level flow chart showing a method for uncertainty modeling of point cloud in accordance with an exemplary embodiment of the present disclosure.

Referring first to FIG. 1, there is shown a high level flow chart of a computer-implemented method 100 for uncertainty modeling of point cloud in accordance with an exemplary embodiment of the present disclosure.

The method 100 starts with step 101 finding the neighboring points for each point. As used herein, the neighboring points for each point are found by direct indexing if the point cloud is organized or by using the kd-tree if the point cloud is unorganized.

Moreover, for the sake of simplicity, the method can further comprise fitting a local operation plane by using the Eigenvalue Decomposition and transform the points into the local operation plane coordinate system.

Then the method goes to step 102 fitting a local quadratic surface for each point. Here, the local quadratic surface can be constructed by a Hessian Matrix. As stated above, for the sake of simplicity, the local quadratic surface for each point will be fitted in its local operation plane, and then construct a Hessian Matrix for the local quadratic surface.

The method ends with step 103 generating a Gaussian Model for representing the uncertainty modeling of the local surface at each point. As the same, the covariance matrix of each point can be constructed first, and then the covariance matrix can be transformed from the local operation plane coordination system into the original point cloud coordinates system.

As used herein, a Gaussian Model is a type of density model which comprises a number of Gaussian distributions. For example, a typical Gaussian Model in one dimension may take the form of formula (1) as below:

[Math. 0001]

$$p(x) = \sum_{k=1}^{K} \pi_k p(x|k) \tag{1}$$

wherein K is the number of Gaussian distributions contained in the Gaussian Model, $\pi_k$ is the composition weight of the $k^{th}$ Gaussian distribution, and p (x|k) is the probability density function of the $k^{th}$ Gaussian distribution which is defined by its average μk and covariance $b_k$. In particular, a typical Gaussian distribution (i.e., the probability density function of the Gaussian distribution) in one dimension may take the form of formula (2) as below:

[Math. 0002]

$$p(x) = \frac{1}{\sigma\sqrt{2\pi}} \exp\left(-\frac{(x-\mu)^2}{2\sigma^2}\right) \tag{2}$$

wherein $\mu_k$ is the average, and $p_k$ is the covariance.

[Math. 0003]

$$f(x) = \frac{1}{\sqrt{(2\pi)^k |\Sigma|}} \exp\left(-\frac{1}{2}(x-\mu)^T \sum\nolimits^{-1} (x-\mu)\right) \tag{3}$$

According to the definition of Gaussian distributions, it is known that the geometric shape of a Gaussian distribution in a two dimensional space resembles that of an ellipse, and that the geometric shape of a Gaussian distribution in a three dimensional space resembles that of an ellipsoid.

The method according to the present invention will be illustrated with reference to FIG. 2.

If a point $_G p$ is observed, it is probable that another point $_G^{ne} p_i$ near $_G p$ could also be observed on the local surface. For each $_G p$, we chose to fit a quadratic surface with the neighboring points of $_G p$ and calculate the normal and the curvature of the local surface. The reason for this choice is that the point cloud observed by the laser scanner is relatively sparse regarding the accuracy of each individual point, and its neighboring points are sufficient to determine the local surface shape. Since the local surface uncertainty modeling for each point happens exactly after the acquisition of each frame of the point cloud, where the point cloud is still organized, or say ordered, the neighboring points for each point can be easily indexed.

The neighboring points $_G^{ne} p_1, _G^{ne} p_2, \ldots, _G^{ne} p_n$ can be directly indexed if the point cloud is organized or by using the kd-tree if the point cloud is unorganized.

$$_G p = (x,y,z)^T \tag{4}$$

[Math. 0004]

$$_G^{ne} p_i = (x_i, y_i, z_i)^T \tag{5}$$

Formulas (4) and (5) show the coordinates of the point $_G p$ and the neighboring points $_G^{ne} p_i$ in the original point cloud coordinates system.

Now, a temporary local coordinates system needs to be constructed, in which the quadratic can be fitted. Define

[Math. 0005]

$$\mu_p = \frac{1}{n+1}({}_Gp + {}_G^{ne}p_1 + {}_G^{ne}p_2 + \ldots + {}_G^{ne}p_n) \quad (6)$$

and

[Math. 0006]

$$C = \frac{1}{n}\sum_{p \in P}(p - \mu_p)(p - \mu_p)^T = R^T \sum R \quad (7)$$

Wherein R is the rotation matrix from the original point cloud coordinate system to the local operation plane coordinates system.

Therefore, a local operation plane at p can be fitted by using the Eigenvalue Decomposition of the matrix C.

Transform the neighboring points ${}_G^{ne}p_1, {}_G^{ne}p_2, \ldots, {}_G^{ne}p_n$ into the local operation plane coordinate system by executing

[Math. 0007]

$${}_L^{ne}p_i = R({}_G^{ne}p_i - {}_Gp), i=1,2,\ldots,n \quad (8)$$

In p, each point has corresponding coordinates

[Math. 0008]

$${}_L^{ne}p_i = ({}_Lx_i, {}_Ly_i, {}_Lz_i)^T \quad (9)$$

and with a Hessian matrix H

[Math. 0009]

$$H = \begin{bmatrix} a_{xx} & a_{xy} \\ a_{xy} & a_{yy} \end{bmatrix} \quad (10)$$

Here, denote

[Math. 0010]

$$A = \begin{bmatrix} {}_Lx_1^2 & {}_Lx_1{}_Ly_1 & {}_Ly_1^2 \\ \vdots & \vdots & \vdots \\ {}_Lx_n^2 & {}_Lx_n{}_Ly_n & {}_Ly_n^2 \end{bmatrix} \quad (11)$$

[Math. 0011]

$$b = \begin{bmatrix} {}_Lz_1 \\ \vdots \\ {}_Lz_n \end{bmatrix} \quad (12)$$

The coefficients $a_{xx}$, $a_{xy}$ and $a_{yy}$ of the Hessian matrix H in (10) can be solved by using the Least Squares formula I $$(A(a_{xx}, a_{xy}, a_{yy})^T - b)^2 \quad (13)$$

$$(a_{xx}, a_{xy}, a_{yy})^T = (A^TA)^{-1}A^Tb \quad (14)$$

Having the Hessian matrix H of the quadratic, the local tangent patch can be derived explicitly. The eigenvalues of H, denoted as and $k_1$ and $k_2$ ($k_1 \geq k_2$), can be obtained by performing the eigenvalue decomposition $$H = UKU^T \quad (15)$$

[Math. 0012]

$$K = \begin{bmatrix} k_1 & 0 \\ 0 & k_2 \end{bmatrix} \quad (16)$$

where the orthogonal matrix U is exactly the transformation from the eigenspace to the original space.

In fact, $k_1$ and $k_2$ are the principal curvatures of the surface at p. And accordingly $1/k_1$ and $1/k_2$, which are then the principal radius, can be used to represent the lengths of the main axes of a local tangent patch at p. FIG. 1 shows the local tangent patch that can be extracted from the quadratic surface.

Interestingly,

[Math. 0013]

$$H^{-1} = (UKU^T)^{-1} = U\begin{bmatrix} \frac{1}{k_1} & 0 \\ 0 & \frac{1}{k_2} \end{bmatrix} U^T \quad (17)$$

Thus $H^{-1}$ exactly represents an ellipse of the local tangent patch.

Furthermore, by adding noise on the tangent patch, the uncertainty of the local surface can be modeled. Define $\sigma_T$ to be a parameter that adjust the level of uncertainty along the local tangent surface and $\sigma_n$ to be a parameter that adjust the level of uncertainty along normal direction of the local tangent surface, the covariance matrix $\Sigma s_p$ can be denoted by

[Math. 0014]

$${}_L\Sigma = \begin{bmatrix} \sigma_T^2 H^{-1} & 0 \\ 0 & \sigma_n^2 \end{bmatrix} \quad (18)$$

Then, transform the covariance matrix from the local operation plane coordinate system into the original point cloud coordinates system using the rotation matrix R defined in (7):

$${}_G\Sigma = R^T {}_L\Sigma R \quad (19)$$

Finally, the local surface uncertainty at p is represented by a particularly normalized Gaussian distribution:

[Math 0015]

$$N(p|{}_Gp, {}_G\Sigma) = (2\pi)^{-1/2}\sigma_n^{-1}\exp(-1/2(p-{}_Gp)^T {}_G\Sigma(p-{}_Gp)) \quad (20)$$

Figure 2:
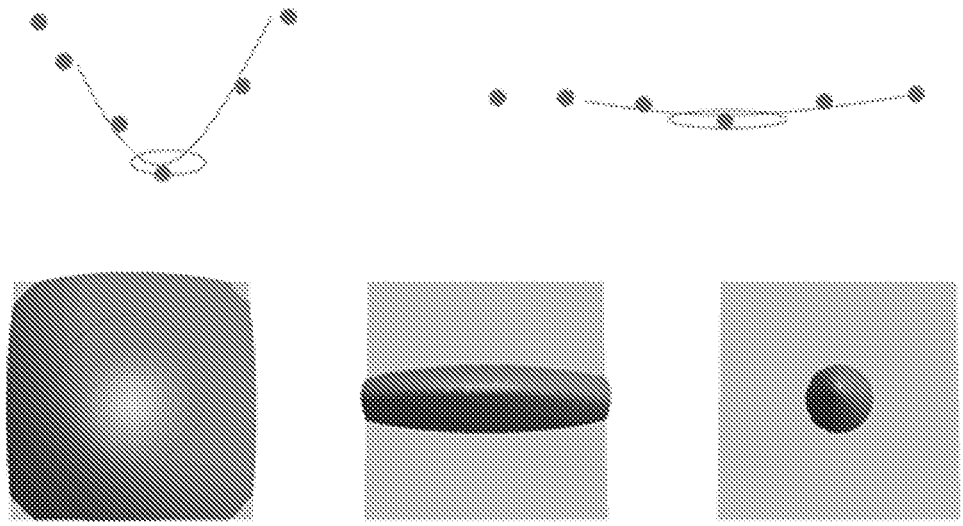
FIG. 2 shows different local tangent patches of the local quadratic surface.

FIG. 2 shows different local tangent patches of the local quadratic surface. According to the present invention, a local quadratic is estimated in a point-wise manner and a properly designed ellipse is used to represent the local tangent patch, which makes the combination of all the local quadratics can infer the arbitrary shape of the implicit surface with limited computational complexity, therefore, accurately modeling the shape of the local surface is achieved.

Figure 3:
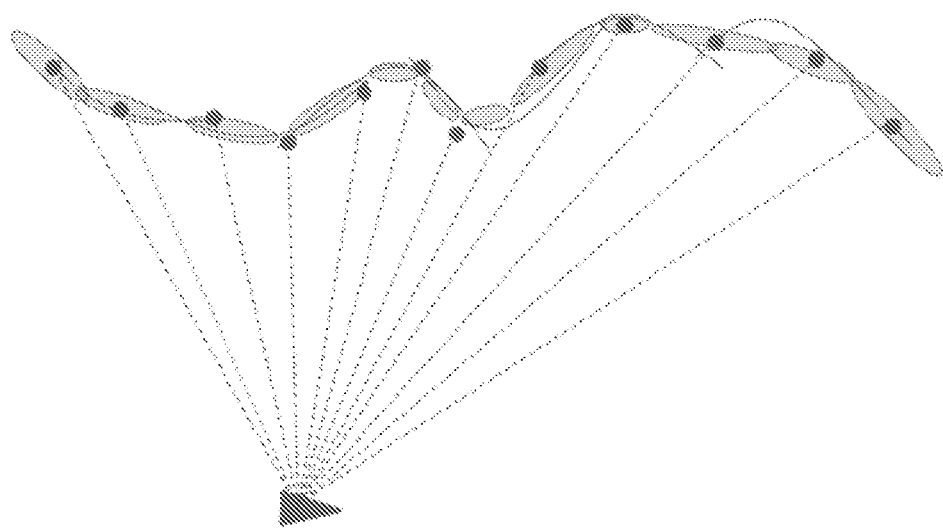
FIG. 3 is a schematic diagram showing a method for uncertainty modeling of a point cloud.

FIG. 3 is a schematic diagram shown the method for uncertainty modeling of point cloud. It can be seen that the uncertainty modeling of the local quadratic surface is represented by ellipses.

Further, according to the present invention, this method can adapt to point cloud with different densities and that with varying densities.

This method accurately models the uncertainty of the underlying surface indicated by the point cloud, instead of modeling the uncertainty of the points directly. So the resulted uncertainty model is more close to the truth.

Since the kernel of the uncertainty model is in the form of Gaussian distribution, there's a smoother score function with less local minimums and the close form first order and second order derivatives can be easily derived.

Figure 4:
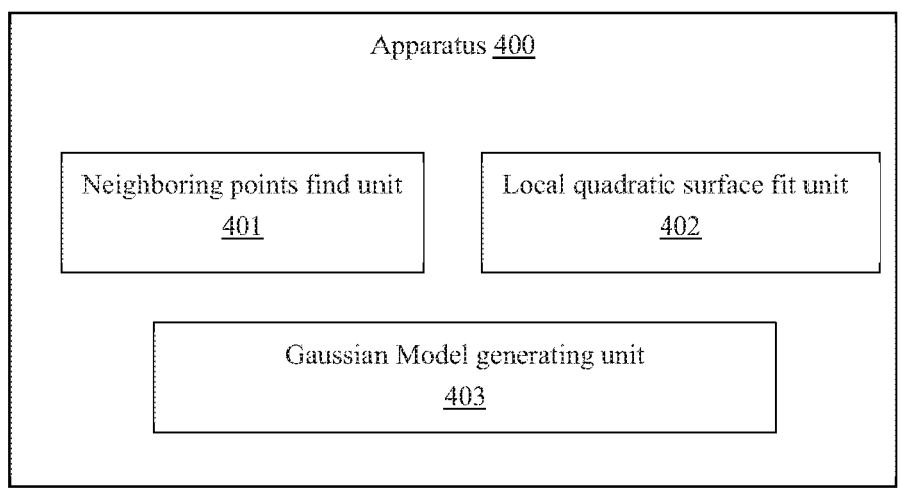
FIG. 4 illustrates an apparatus for uncertainty modeling of a point cloud in accordance with an exemplary embodiment of the present disclosure.

FIG. 4 illustrates an apparatus for uncertainty modeling of a point cloud in accordance with an exemplary embodiment of the present disclosure.

The apparatus 400 may comprise a neighboring points find unit 401 configured to find the neighboring points for each point; a local quadratic surface fit unit 402 configured to fit a local quadratic surface for each point; and a Gaussian Model generating unit 403 configured to generate a Gaussian Model for representing the uncertainty modeling of the local surface at each point.

It is noted that the neighboring points find unit 401, the local quadratic surface fit unit 402 and the Gaussian Model generating unit 403 of the apparatus 400 can be configured to perform corresponding operations in method 100, and such operations are omitted herein. Additionally, the descriptions directed to method 100 are equally applicable to the apparatus 400.

Figure 5:
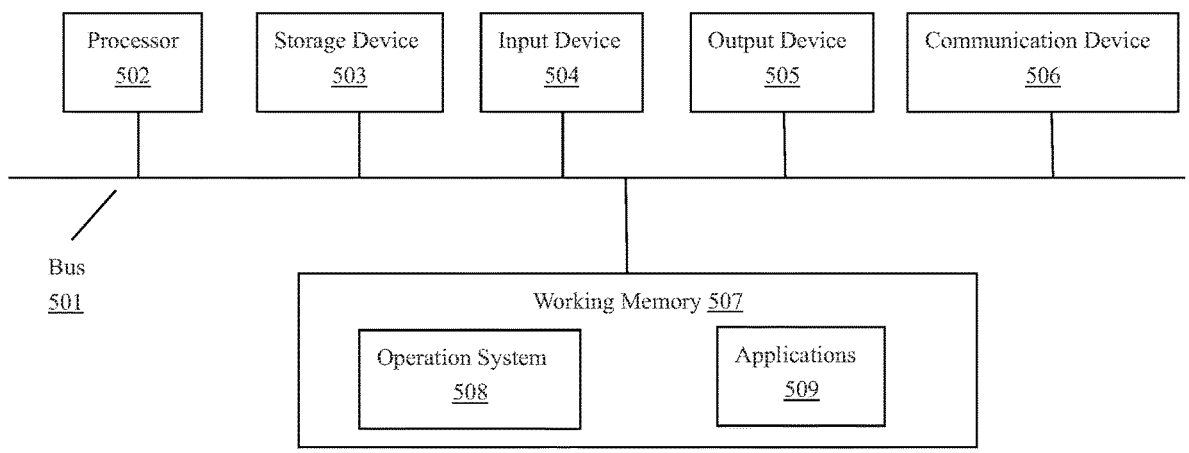
FIG. 5 illustrates a block diagram of computing device which is an example of the hardware device that may be applied to the aspects of the present disclosures in accordance with an exemplary embodiment of the present disclosure.

FIG. 5 illustrates a block diagram of a computing device which is an example of the hardware device that may be applied to the aspects of the present disclosures in accordance with an exemplary embodiment of the present disclosure.

With reference to FIG. 5, a computing device 500, which is an example of the hardware device that may be applied to the aspects of the present disclosures, will now be described. The computing device 500 may be any machine configured to perform processing and/or calculations, and may be, but is not limited to, a work station, a server, a desktop computer, a laptop computer, a tablet computer, a personal data assistant, a smart phone, an on-vehicle computer or any in combination. The aforementioned various apparatuses/server/client device may be wholly or at least partially implemented by the computing device 500 or a similar device or system.

The computing device 500 may comprise elements that are connected with or in communication with a bus 501, possibly via one or more interfaces. For example, the computing device 500 may comprise the bus 501, and one or more processors 502, one or more input devices 504 and one or more output devices 505. The one or more processors 502 may be any kinds of processors, and may comprise but are not limited to one or more general-purpose processors and/or one or more special-purpose processors (such as special processing chips). The input devices 504 may be any kinds of devices that can input information to the computing device, and may comprise, but are not limited to, a mouse, a keyboard, a touch screen, a microphone and/or a remote control. The output devices 505 may be any kinds of devices that can present information, and may comprise, but are not limited to, a display, a speaker, a video/audio output terminal, a vibrator and/or a printer. The computing device 500 may also comprise or be connected with non-transitory storage devices 503 which may be any storage devices that are non-transitory and can implement data stores, and may comprise, but are not limited to, a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 503 may be detachable from an interface. The non-transitory storage devices 503 may have data/instructions/code for implementing the methods and steps which are described above. The computing device 500 may also comprise a communication device 506. The communication device 506 may be any kind of device or system that can enable communication with external apparatuses and/or with a network, and may comprise, but is not limited to, a modem, a network card, an infrared communication device, a wireless communication device and/or a chipset such as a Bluetooth™ device, 1302.11 device, WiFi device, WiMax device, cellular communication facilities and/or the like.

When the computing device 500 is used as an on-vehicle device, it may also be connected to an external device, for example, a GPS receiver, sensors for sensing different environmental data such as an acceleration sensor, a wheel speed sensor, a gyroscope and so on. In this way, the computing device 500 may, for example, receive location data and sensor data indicating the travelling situation of the vehicle. When the computing device 500 is used as an on-vehicle device, it may also be connected to other facilities (such as an engine system, a wiper, an anti-lock Braking System or the like) for controlling the traveling and operation of the vehicle.

In addition, the non-transitory storage devices 503 may have map information and software elements so that the processor 502 may perform route guidance processing. In addition, the output device 505 may comprise a display for displaying the map, the location mark of the vehicle and also images indicating the travelling situation of the vehicle. The output device 505 may also comprise a speaker or interface with an ear phone for audio guidance.

The bus 501 may include, but is not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 501 may also include a Controller Area Network (CAN) bus or other architectures designed for application on an automobile.

The computing device 500 may also comprise a working memory 507, which may be any kind of working memory that may store instructions and/or data useful for the working of the processor 502, and may comprise but is not limited to a random access memory and/or a read-only memory device.

Software elements may be located in the working memory 507, including but not limited to an operating system 508, one or more application programs 509, drivers and/or other data and codes. Instructions for performing the methods and steps described in the above may be comprised in the one or more application programs 509, and the means/units/elements of the aforementioned various apparatuses/server/client device may be implemented by the processor 502 reading and executing the instructions of the one or more application programs 509.

It should also be appreciated that variations may be made in accordance with specific requirements. For example, customized hardware might also be used, and/or particular elements might be implemented in hardware, software, firmware, middleware, microcode, hardware description languages, or any combination thereof. Further, connection to other computing devices such as network input/output devices may be employed. For example, some or all of the disclosed methods and devices may be implemented by programming hardware (for example, a programmable logic circuitry including field-programmable gate arrays (FPGA) and/or programmable logic arrays (PLA)) with an assembler language or a hardware programming language (such as VERILOG, VHDL, C++) by using the logic and algorithm according to the present disclosure.

Although aspects of the present disclosures have been described with reference to the drawings, the methods, systems, and devices described above are merely examples, and the scope of the present disclosure is not limited by these aspects, but is only defined by the appended claims and equivalents thereof. Various elements may be omitted or may be substituted by equivalent elements. In addition, the steps may be performed in an order different from what is described in the present disclosures. Furthermore, various elements may be combined in various manners. What is also important is that as the technology evolves, many of the elements described may be substituted by equivalent elements which emerge after the present disclosure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A computer-implemented method for uncertainty modeling of a point cloud, comprising:
   finding neighboring points for each point in the point cloud;
   fitting a local quadratic surface for each point in the point cloud;
   generating a Gaussian Model for representing the uncertainty modeling of the local surface at each point in the point cloud; and
   finding the neighboring points for each point in the point cloud by direct indexing if the point cloud is organized and by using the kd-tree if the point cloud is unorganized.

2. The method according to claim 1, wherein finding the neighboring points for each point in the point cloud comprises fitting a local operation plane by using an Eigenvalue Decomposition and transforming the points into the local operation plane coordinate system.

3. The method according to claim 2, wherein fitting a local quadratic surface for each point in the point cloud comprises fitting the local quadratic surface for each point in its local operation plane, and constructing a Hessian matrix for the local quadratic surface.

4. The method according to claim 3, wherein generating a Gaussian Model for representing the uncertainty modeling of the local surface at each point comprises constructing a covariance matrix of each point, and transforming the covariance matrix from the local operation plane coordination system into an original point cloud coordinate system.

5. The method according to claim 1, wherein an uncertainty model of the local surface at p is represented in a Gaussian Distribution form as follows:

$$N(p|_G p, _G \Sigma) = (2\pi)^{-1/2} \sigma_n^{-1} \exp(-1/2(p - _G p)^T {_G \Sigma}(p - _G p))$$

wherein $_G P$ is a coordinate of one point of the point cloud in an original point cloud coordinate system, $_G \Sigma = R^T {_L \Sigma} R$, R is a rotation matrix from the original point cloud coordinate system to the local operation plane coordinates system, and $$_L \Sigma = \begin{bmatrix} \sigma_T^2 H^{-1} & 0 \\ 0 & \sigma_n^2 \end{bmatrix}$$

wherein $\sigma_T$ and $\sigma_n$ are parameters representing an uncertainty along a tangent surface and along a normal direction, respectively, and H is a Hessian matrix for the local quadratic surface.

6. An apparatus for uncertainty modeling of a point cloud, comprising:
   a memory having computer executable instructions stored therein; and
   a processor coupled to the memory and configured to:
      find neighboring points for each point in the point cloud;
      fit a local quadratic surface for each point in the point cloud;
      generate a Gaussian Model for representing the uncertainty modeling of the local surface at each point in the point cloud; and
      find the neighboring points for each point b direct indexing if the point cloud is organized and by using the kd-tree if the point cloud is unorganized.

7. The apparatus according to claim 6, wherein finding the neighboring points for each point comprises fitting a local operation plane by using an Eigenvalue Decomposition and transforming the points into a local operation plane coordinate system.

8. The apparatus according to claim 7, wherein fitting the local quadratic surface for each point comprises fitting the local quadratic surface for each point in its local operation plane, and constructing a Hessian Matrix for the local quadratic surface.

9. The apparatus according to claim 8, wherein generating the Gaussian Model for representing the uncertainty modeling of the local surface at each point comprises constructing a covariance matrix of each point, and transforming the covariance matrix from a local operation plane coordinate system into an original point cloud coordinate system.

10. The apparatus according to claim 6, wherein the uncertainty model of the local surface at p is represented in a Gaussian Distribution form as follows:

$$N(p|_G p, _G \Sigma) = (2\pi)^{-1/2} \sigma_n^{-1} \exp(-1/2(p - _G p)^T {_G \Sigma}(p - _G p))$$

wherein $_G p$ is a coordinate of one point of the point cloud in the original point cloud coordinate system, $_G \Sigma = R^T {_L \Sigma} R$, R is the rotation matrix from the original point cloud coordinate system to the local operation plane coordinate system, and $$_L \Sigma = \begin{bmatrix} \sigma_T^2 H^{-1} & 0 \\ 0 & \sigma_n^2 \end{bmatrix}$$

wherein $\sigma_T$ and $\sigma_n$ are parameters representing uncertainty along a tangent surface and along a normal direction, respectively, and H is a Hessian matrix for the local quadratic surface.

11. A non-transient storage medium having instructions stored thereon that when executed cause a processor to implement a computer-implemented method for uncertainty modeling of a point cloud, comprising:
   causing the processor o find neighboring points for each point in the point cloud;
   causing the processor to fit a local quadratic surface for each point in the point cloud; and causing the processor to generate a Gaussian Model for representing the uncertainty modeling of a local surface at each point in the point cloud; and causing the processor to find the neighboring points for each point by direct indexing if the point cloud is organized and by using the kd-tree if the point cloud is unorganized.

12. An apparatus for uncertainty modeling of a point cloud, comprising:

a neighboring points finding unit configured to find neighboring points for each point in the point cloud;

a local quadratic surface fitting unit configured to fit a local quadratic surface for each point in the point cloud;

a Gaussian Model generating unit configured to generate a Gaussian Model for representing the uncertainty modeling of a local surface at each point in the point cloud; and wherein the neighboring points finding unit finds the neighboring points for each point in the point cloud by direct indexing if the point cloud is organized and by using the kd-tree if the point cloud is unorganized.

13. The method according to claim 1, wherein an uncertainty model of the local surface at p is represented in a Gaussian Distribution form as follows:

$$N(p|_G p, {_G}\Sigma) = (2\pi)^{-1/2} \sigma_n^{-1} \exp(-1/2(p - {_G}p)^T {_G}\Sigma(p - {_G}p))$$

wherein $_G P$ is a coordinate of one point of the point cloud in an original point cloud coordinate system, $_G\Sigma = R^T {_L}\Sigma R$, R is a rotation matrix from the original point cloud coordinate system to the local operation plane coordinates system, and $$_L\Sigma = \begin{bmatrix} \sigma_T^2 H^{-1} & 0 \\ 0 & \sigma_n^2 \end{bmatrix}$$

wherein $\sigma_T$ and $\sigma_n$ are parameters representing an uncertainty along a tangent surface and along a normal direction, respectively, and H is a Hessian matrix for the local quadratic surface.

14. The method according to claim 2, wherein an uncertainty model of the local surface at p is represented in a Gaussian Distribution form as follows:

$$N(p|_G p, {_G}\Sigma) = (2\pi)^{-1/2} \sigma_n^{-1} \exp(-1/2(p - {_G}p)^T {_G}\Sigma(p - {_G}p))$$

wherein $_G p$ is a coordinate of one point of the point cloud in an original point cloud coordinate system, $_G\Sigma = R^T {_L}\Sigma R$, R is a rotation matrix from the original point cloud coordinate system to the local operation plane coordinates system, and $$_L\Sigma = \begin{bmatrix} \sigma_T^2 H^{-1} & 0 \\ 0 & \sigma_n^2 \end{bmatrix}$$

wherein $\sigma_T$ and $\sigma_n$ are parameters representing an uncertainty along a tangent surface and along a normal direction, respectively, and H is a Hessian matrix for the local quadratic surface.

15. The method according to claim 3, wherein an uncertainty model of the local surface at p is represented in a Gaussian Distribution form as follows:

$$N(p|_G p, {_G}\Sigma) = (2\pi)^{-1/2} \sigma_n^{-1} \exp(-1/2(p - {_G}p)^T {_G}\Sigma(p - {_G}p))$$

wherein $_G p$ is a coordinate of one point of the point cloud in an original point cloud coordinate system, $_G\Sigma = R^T {_L}\Sigma R$, R is a rotation matrix from the original point cloud coordinate system to the local operation plane coordinates system, and $$_L\Sigma = \begin{bmatrix} \sigma_T^2 H^{-1} & 0 \\ 0 & \sigma_n^2 \end{bmatrix}$$

wherein $\sigma_T$ and $\sigma_n$ are parameters representing an uncertainty along a tangent surface and along a normal direction, respectively, and H is a Hessian matrix for the local quadratic surface.

16. The apparatus according to claim 6, wherein the uncertainty model of the local surface at p is represented in a Gaussian Distribution form as follows:

$$N(p|_G p, {_G}\Sigma) = (2\pi)^{-1/2} \sigma_n^{-1} \exp(-1/2(p - {_G}p)^T {_G}\Sigma(p - {_G}p))$$

wherein $_G p$ is a coordinate of one point of the point cloud in the original point cloud coordinate system, $_G\Sigma = R^T {_L}\Sigma R$, R is the rotation matrix from the original point cloud coordinate system to the local operation plane coordinate system, and $$_L\Sigma = \begin{bmatrix} \sigma_T^2 H^{-1} & 0 \\ 0 & \sigma_n^2 \end{bmatrix}$$

wherein $\sigma_T$ and $\sigma_n$ are parameters representing uncertainty along a tangent surface and along a normal direction, respectively, and H is a Hessian matrix for the local quadratic surface.

17. The apparatus according to claim 7, wherein the uncertainty model of the local surface at p is represented in a Gaussian Distribution form as follows:

$$N(p|_G p, {_G}\Sigma) = (2\pi)^{-1/2} \sigma_n^{-1} \exp(-1/2(p - {_G}p)^T {_G}\Sigma(p - {_G}p))$$

wherein $_G p$ is a coordinate of one point of the point cloud in the original point cloud coordinate system, $_G\Sigma = R^T {_L}\Sigma R$, R is the rotation matrix from the original point cloud coordinate system to the local operation plane coordinate system, and $$_L\Sigma = \begin{bmatrix} \sigma_T^2 H^{-1} & 0 \\ 0 & \sigma_n^2 \end{bmatrix}$$

wherein $\sigma_T$ and $\sigma_n$ are parameters representing uncertainty along a tangent surface and along a normal direction, respectively, and H is a Hessian matrix for the local quadratic surface.

18. The apparatus according to claim 8, wherein the uncertainty model of the local surface at p is represented in a Gaussian Distribution form as follows:

$$N(p|_G p, {_G}\Sigma) = (2\pi)^{-1/2} \sigma_n^{-1} \exp(-1/2(p - {_G}p)^T {_G}\Sigma(p - {_G}p))$$

wherein $_G P$ is a coordinate of one point of the point cloud in the original point cloud coordinate system, $_G\Sigma = R^T {_L}\Sigma R$, R is the rotation matrix from the original point cloud coordinate system to the local operation plane coordinate system, and $$_L\Sigma = \begin{bmatrix} \sigma_T^2 H^{-1} & 0 \\ 0 & \sigma_n^2 \end{bmatrix}$$

wherein $\sigma_T$ and $\sigma_n$ are parameters representing uncertainty along a tangent surface and along a normal direction, respectively, and H is a Hessian matrix for the local quadratic surface.

* * * * *